UNITED STATES PATENT OFFICE.

WALTHER FELD, OF HÖNNINGEN-ON-THE-RHINE, GERMANY.

PRODUCTION OF FERROCYANIDS FROM GAS.

No. 832,466.     Specification of Letters Patent.     Patented Oct. 2, 1906.

Application filed May 1, 1906. Serial No. 314,699.

*To all whom it may concern:*

Be it known that I, WALTHER FELD, a subject of the King of Prussia, German Emperor, residing in Hönningen-on-the-Rhine, Kingdom of Prussia, German Empire, have invented certain new and useful Improvements in the Production of Ferrocyanids from Cyanogen Contained in Gases, of which the following is a specification.

In order to obtain ferrocyanids from the cyanogen in coal-gases and the like, such gas has been treated with a suspension or solution of an iron compound, together with a basic substance, such as alkali, earth alkali, magnesia, or ammonia. In some cases the ammonia present in the gas has been used as the basic substance with or without the addition of a salt solution to the iron compound. The gases as a rule contain sulfureted hydrogen, by which the iron compound is converted into sulfid of iron. The absorption of hydrocyanic acid by sulfid of iron in the presence of a basic substance is slow and incomplete, as such absorption is a secondary reaction, as shown in the following equation:

(1) $FeSO_4 + 2NH_3 + H_2S = FeS + (NH_4)_2SO_4$.

(2) $FeS + 2NH_3 + 2HCN = Fe(CN)_2 + (NH_4)_2S$.

(3) $Fe(CN)_2 + 4NH_3 + 4HCN = (NH_4)_4Fe(CN)_6$.

To explain the process, the compound precipitated from ferrocyanid solutions by ferrous salts is referred to as "ferrous cyanid," ($Fe(CN)_2$,) although this precipitate is supposed to be ferrous ferrocyanid, ($Fe_2Fe(CN)_6$,) or a compound of similar constitution, which frequently contains an admixture of alkali, earth alkali, and ammonia ferrocyanid in small proportion. It is essential for the process that this compound shall contain iron and cyanogen in the molecular proportion of one to two, respectively, as indicated by the formula $Fe(CN)_2$. I have now found that the conversion of the iron compound employed into sulfid of iron is avoided by treating the iron compound with a ferrocyanid of an alkali, an earth alkali, magnesia, or ammonia before the said iron compound comes into contact with the gas to be treated.

(4) $2FeSO_4 + Ca_2Fe(CN)_6 = 3Fe(CN)_2 + 2CaSO_4$.

In using ferrous sulfate as the iron compound and ferrocyanid of calcium for its precipitation gypsum and ferrous cyanid are formed. If the gas be treated with this ferrous cyanid, the absorption of hydrocyanic acid becomes a primary one, as hereinafter shown in equation 5. The ferrocyanid used for the formation of ferrous cyanid can be soluble or insoluble—for example, calcium potassium ferrocyanid ($CaK_2Fe(CN)_6$) and the like may be employed.

The following is an example of how this invention may be performed, in which ferrous chlorid ($FeCl_2$) is the iron compound employed and calcium ferrocyanid is used to precipitate the ferrous cyanid and lime is the basic substance employed; but it is to be understood that I do not limit myself to the use of these substances. The ferrous chlorid is dissolved in water, and to this solution is added sufficient calcium ferrocyanid to precipitate all the ferrous chlorid from the solution. To two molecular proportions of ferrous chlorid nearly one molecular proportion of calcium ferrocyanid is used; but an excess of calcium ferrocyanid does not interfere with the process. Insoluble ferrous cyanid and soluble calcium chlorid are formed. The calcium ferrocyanid solution may be added to the ferrous chlorid or the ferrous chlorid may be added to the calcium-ferrocyanid solution. The liquor thus prepared is mixed with at least two molecular proportions of lime for each molecular proportion of ferrous chlorid. The basic substance may be added to either solution either before or after the precipitation of ferrous cyanid. In treating the gas with this liquor hydrocyanic acid is absorbed according to the following equation:

(5) $3Fe(CN)_2 + 6Ca(OH)_2 + 12HCN = 3Ca_2Fe(CN)_6 + 12H_2O$.

The absorption is quicker and more complete than it would be if sulfid of iron were formed before the formation of cyanid. The process can be carried out with either hot or cold gas and with either hot or cold liquor, and it is immaterial whether the gas contains ammonia or not. If there be ammonia in the gas, some insoluble ammonium-calcium ferrocyanid is formed; but this formation is less in proportion as the heat under which the reaction is carried on is greater.

Instead of using a ferrocyanid salt to precipitate ferrous cyanid the liquor which has already been used for treating gas and which contains ferrocyanid in the required form can be used for precipitation. If the liquor containing the ferrous cyanid should be too dilute, it may be separated from ferrous cyanid by filtration and the ferrous cyanid be mixed with water or milk of lime in the required proportion before using it to treat the gas.

I claim as my invention—

1. The process of obtaining ferrocyanids which consists in treating a gas containing hydrocyanic acid and sulfureted hydrogen with an iron compound to which a basic substance is added and from which before bringing the compound in contact with the gas, ferrous cyanid is precipitated by treating with a ferrocyanid salt.

2. The process of obtaining ferrocyanids which consists in treating a gas containing hydrocyanic acid and sulfureted hydrogen with an iron compound to which a basic substance is added and from which before bringing in contact with the gas ferrous cyanid is precipitated by treating with a liquor from which ferrous cyanid has previously been precipitated by treatment with a ferrocyanid salt.

In testimony whereof I have signed this specification in the presence of two subscribing witnesses.

WALTHER FELD.

Witnesses:
WOLDEMAR HAUPT,
HENRY HASPER.